March 8, 1938.  L. R. McAFOOS  2,110,467
VALVE STRUCTURE FOR REGENERATIVE FURNACE SYSTEMS
Filed June 1, 1936  2 Sheets-Sheet 1
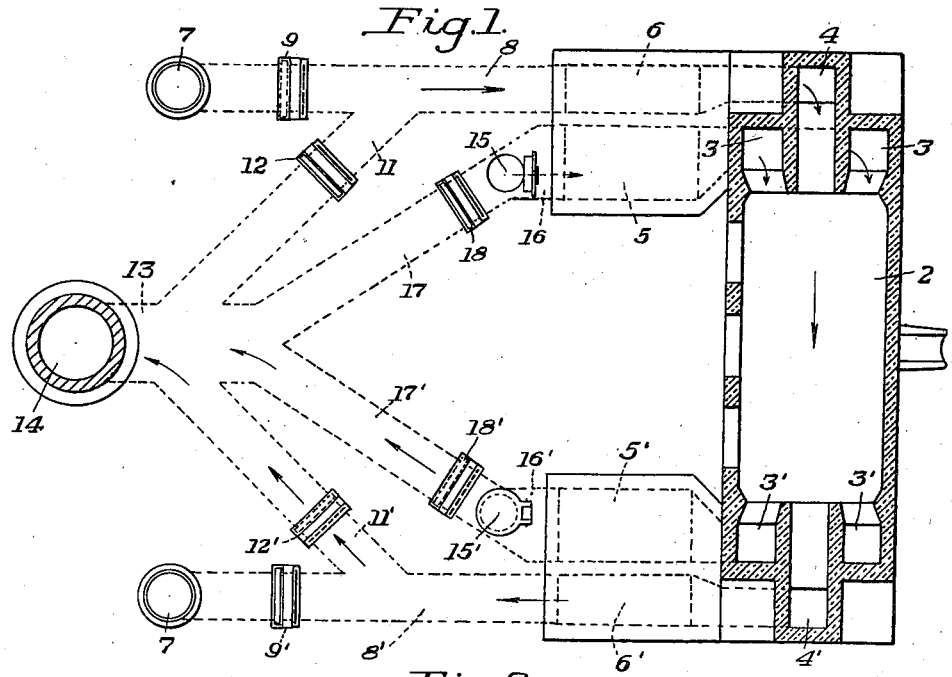
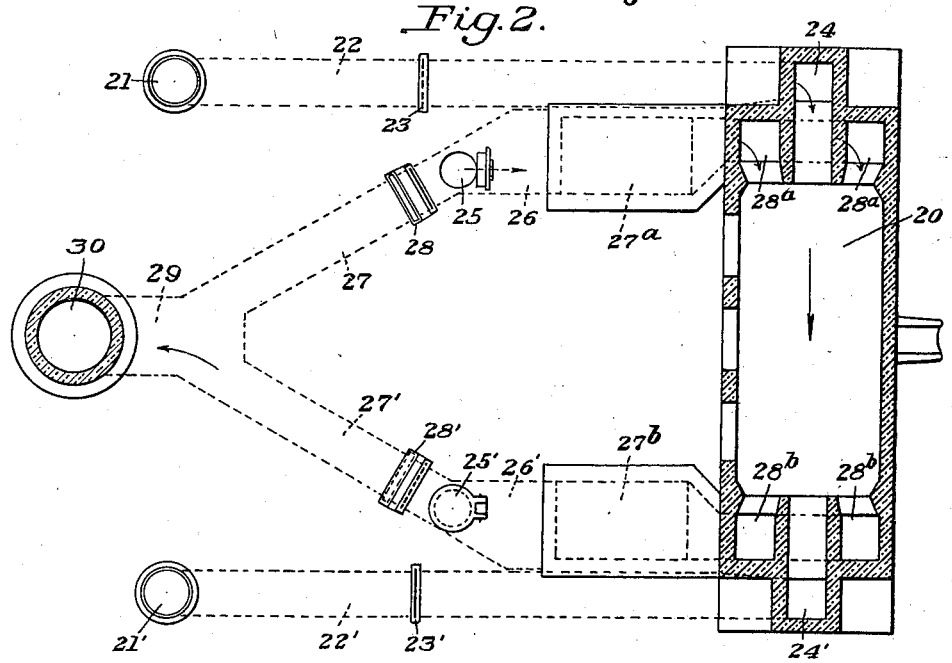
INVENTOR
Lawrence R. McAfoos
by his atty'
Stebbins, Blenko & Parmelee

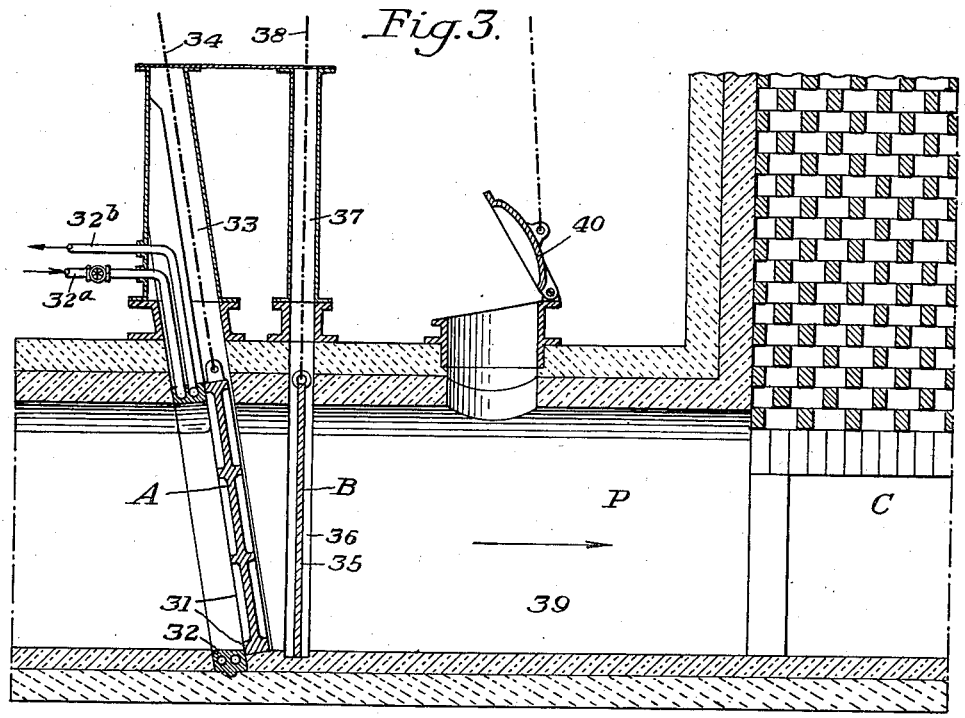
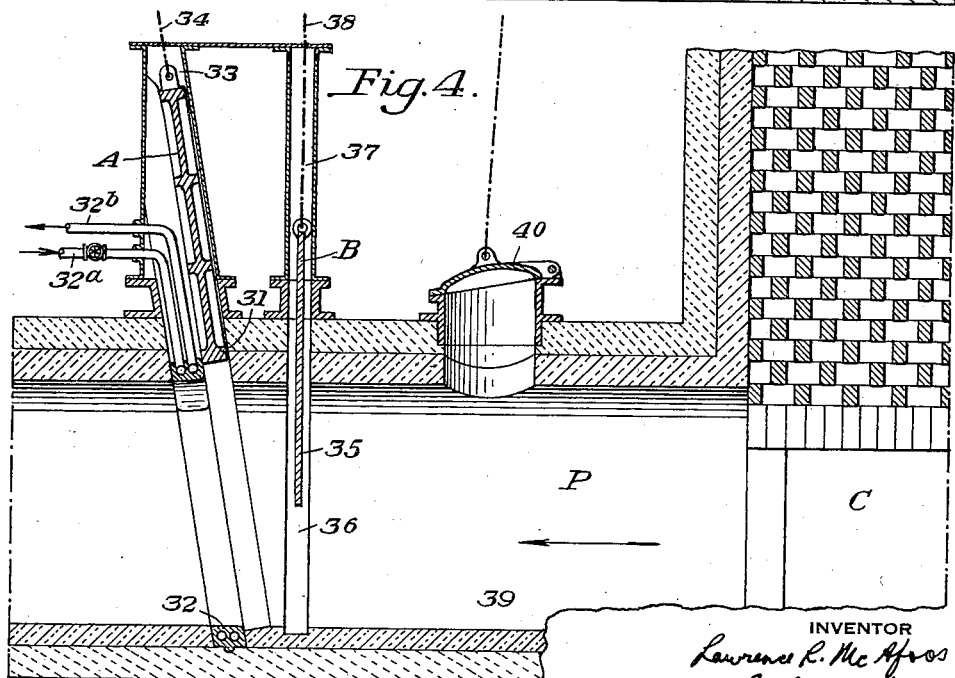

Patented Mar. 8, 1938

2,110,467

UNITED STATES PATENT OFFICE 2,110,467

VALVE STRUCTURE FOR REGENERATIVE FURNACE SYSTEMS

Lawrence R. McAfoos, Pittsburgh, Pa., assignor to Reliance Steel Products Company, Rankin, Pa., a corporation of Pennsylvania Application June 1, 1936, Serial No. 82,901

7 Claims. (Cl. 137—78)

My invention relates in general to valve structures for furnace systems and is particularly applicable to valve or dampers for use in connection with open hearth regenerative furnaces and like structures.

In the construction of open hearth furnaces, it is usual to incorporate therewith certain structures which in some measure conserve the heat generated in the operation of the furnaces. In such a furnace which is commonly designated as a "regenerative furnace" the waste products of combustion, usually at a high temperature after leaving the melting or heating chamber are passed through so called "checkers", wherein the gases give up part of their heat to bricks which are placed in certain patterns in the checker chambers. After a given period of time, for example, about 20 minutes, the flow of gases through the furnace system is reversed, so that the air used for combustion, and in certain installations the fuel gases also pass through the checker chambers which have been previously heated by the discharging waste gases on their way to the discharge stack. In passing through the heated checker chambers, the air for combustion, and where the fuel gases also are heated, they as well, are heated and discharged into the melting chamber where they are mixed and burned. By this cycle, wherein the checker chambers are heated by the waste gases and upon reversal of flow, the checker chamber heats the incoming air and in some cases the fuel gas also, considerable thermal economies are achieved.

It is well known to those skilled in the open hearth furnace art that provision may be made for heating only the ingoing air by passing it through the heated checker chambers, and this practice is customary where a gas having high thermal properties is used, for example, natural gas. In such operation, the fuel gas is passed into the furnace without preliminary heating. Where a gas having low thermal properties, such as blast furnace gas, is used, both the fuel gas and air are heated by passing through the checker chambers before being introduced into the combustion zone in the melting chamber.

A regenerative furnace system therefore includes at least one pair of checker chambers, which are alternately used for absorbing heat from the waste gases and for giving up this absorbed heat to the ingoing air to heat it before it is introduced in the combustion chamber.

The amount of gas and air admitted to the chamber and the passage of waste gases on their way to the discharge stack are regulated by some form of throttle valve or damper. Reversing apparatus is also necessary since the course of the currents must be changed several times each hour. For this purpose, some form of valve must be used.

The waste gases may be red hot having a temperature at certain periods of operation of the furnace of over 2000° F., and the checker chambers may be heated to approximately this temperature. It will be apparent that the valves are normally subjected to a high degree of heat, not only from direct impingement of the highly heated waste gases, but, also, by radiant heat from the highly heated checker chambers. The inevitable result is a warping of the valve or dampers, which cause fuel gases to leak into the chimney and waste gases to be drawn back into the furnace. This is undesirable. A perfect valve should shut tight, should not warp if it gets hot, and should not aid tarry deposits and soot to accumulate thereon, nor appreciably lower the temperature of the gases passing therethrough. A leaking valve permits infiltration of air and leakage of valuable fuel gases and thus prevents accurate regulation of the gas flow and proper control of operating conditions in the furnace. Improper control of operating conditions in the furnace results in a non-uniform product.

Despite the adoption of water-cooled valves which are comparatively expensive to construct and costly to operate, due to the large amount of cooling water employed, the problem of providing suitable valve structures has not heretofore been solved. Water-cooled valves encourage deposit of gummy materials thereon, and incur a loss of sensible heat of the ingoing gases.

I have discovered that if a protecting screen or curtain be placed adjacent the valve, that the valve need not be water-cooled and can be of fairly light and comparatively inexpensive construction. It is understood that this valve will fit closely on its seat and when closed will be practically gas-tight. The associated screen may be decidedly inexpensive and so arranged that it may be quickly replaced when necessary. The effect of the heat which is incident to the operation of the furnace, is expended on the inexpensive protecting screen and in that manner the more expensive valve itself will be protected and give satisfactory service for a long period of time. Furthermore, the comparatively small mass of the curtain damper which can be readily heated up during operation will not appreciably decrease the temperature of gases passing therethrough, as do the present heavy expensive water-cooled structures, and accumulation of soot and tarry deposits on the valve structure will be greatly lessened.

In the accompanying drawings, which illustrate several preferred embodiments of my invention and wherein like characters denote like or corresponding parts throughout the several views, Figure 1 is a diagrammatic plan view of a regenerative heating system, showing the arrangement of the valves;

Figure 2 is a diagrammatic plan view of another regenerative heating system showing the arrangement of the valves;

Figure 3 is a diagrammatic view in section of a valve embodying my invention; and Figure 4 is a schematic view showing the setting of the valves during one operation.

In Figure 1, I have shown an open hearth furnace 2 of the type wherein gas having low thermal properties is used as fuel, so that it is necessary to heat both the air and the fuel gas. The furnace 2 is provided with air slag pockets 3 and 3', gas slag pockets 4 and 4', air checker chambers 5 and 5', and gas checker chambers 6 and 6'.

The fuel gas is conducted from gas supply 7 to the system by means of gas flues 8 and 8' in which dampers 9 and 9' are located, to control the flow of gases to the checker chambers 6 and 6' and thence to the pockets 4 and 4' in the furnace. Passages or flues 11 and 11' controlled by dampers 12 and 12' connect flues 8 and 8' to the stack flue 13 which leads into discharge stack 14. Air is admitted by way of valves 15 and 15' to air flues 16 and 16' which leads into air checker chambers 5 and 5' and thence to ports 3 and 3' in the furnace.

Passages or flues 17 and 17' controlled by valves or dampers 18 and 18' connect flues 16 and 16' to the stack flue 13. When the flow of gases through the furnace is as indicated by the arrow, fuel gas flows through passage 8 through checker chamber 6 to port 4, while air flows through the open valve 15 through passageway 16, through checker chambers 5 into the ports 3. The heated products of combustion pass out of the furnace through ports 3' and 4' and part thereof goes through checker chamber 5' and flues 16', 17', and 13 to stack 14 and the remainder pass through checker chamber 6', flues 8', 11' and 13 to stack 14.

It will be apparent that valves 9, 15, 12' and 18' will be fully or partly opened (the opened valves are shown in dotted lines and the closed valves in full lines), while valves 9', 15', 12, and 18 are fully closed. When the operation is reversed and the flow of gases is in a direction opposite to that shown by the arrow in Figure 1, the valves 9', 15', 12, and 18 are opened while valves 12', 18', 15, and 9 are closed. Valves 9, 9', 12, 12', 18, and 18', which are subjected to high temperatures and to impingement of hot gases during certain portions of the operation cycle are made according to my invention. The construction of these valves will be later described.

Figure 2 shows a suitable arrangement where fuel gas of high thermal content is used and only the air need be heated before it enters the furnace 20. The fuel gas from supply pipe 21 is conducted through pipes 22 and 22' controlled by valves or dampers 23 and 23' to the gas ports 24 and 24' in the furnace. Air is admitted through valves 25 and 25' from whence it passes into flues 26 and 26' through checker chambers 27a and 27b into ports 28a and 28b in the furnace. Passages 26 and 26' are connected by flues or passages 27 and 27' controlled by valves 28 and 28' to stack flue 29 which leads into the discharge stack 30. In some constructions, a damper may be placed in flue 29, although it is not necessary in all installations and is not here illustrated.

When the flow of gases through furnace 20 is in the direction indicated by the arrows, valves 23, 25, and 28' are opened or partly opened and valves 28, 25' and 23' are closed. When the flow of gases is reversed, valves 23', 25' and 28 are opened and valves 23, 25, and 28' are closed.

In Figure 1, the air valves or dampers 15 and 15' and in Figure 2, valves 25 and 25' may be of the commonly used mushroom type or they may be of the hinged cover type as shown in Figure 3, or any other form may be used. Valves 23 and 23' (Figure 2) may be of any suitable type, whereas all the other valves in both Figures 1 and 3 are made according to my invention and will now be described.

In Figures 3 and 4, I have illustrated a section of a damper or valve structure made according to my invention. The valve structure consists of a sealing valve or damper A and a curtain valve or damper B. The valve A may be an ordinary ribbed casting having a continuous circumferential portion 31 which, when the valve is in the closed position illustrated in Figure 3, makes a close fit with the valve seat 32, and thus effectually closes off the passage P in which it is located. If desired, the damper A may be cast as a shell or skeleton and the inner portion thereof filled with ceramic material such as fire brick, although this is not necessary. I prefer to cool the valve seat 32 by means of a cooling fluid which circulates around the valve seat 32. The fluid is introduced through pipe 32a and discharged through pipe 32b. Such cooling arrangement is not wholly necessary but serves to in some measure give a longer life to the seat.

The damper or sealing valve A moves up and down through the chamber 33 and is raised and lowered by means of cable 34 which is attached to suitable control mechanism. The longitudinal axis of the damper A is preferably inclined at an angle to the vertical so that there is more positive contact between the circumference of the damper and the valve seat, both of which are finished so as to make a substantially gas-tight joint.

Adjacent the main damper A is a curtain damper or curtain valve B. This curtain valve is placed between the heat supply source, for example, the checker chamber, and the main valve A. In some layouts, the greatest heat will come from the direction of the discharge stack and in such arrangement, the stack would be the heat supply source and the curtain valve would be placed between the main valve A and the stack. The damper B may consist of a steel plate 35 formed either from ordinary steel or of heat resistant alloy, or it may consist of a circumferential or skeleton portion filled in with refractory material. The valve is preferably vertical and works freely in a groove 36 which may be considerably wider than the thickness of the damper. This damper when raised is received into a compartment 37 and is raised and lowered by means of a cable 38 which may be actuated by any desirable mechanism. The grooves 36 in which the valve 35 is received is made considerably wider than the valve so that in case the plate 35 should warp or become distorted, it will still move in the groove. This plate 35 is of inexpensive construction and so arranged that it can be very quickly replaced without shutting down the furnace should the occasion arise, and it need not be replaced until it has warped to a considerable extent or has partly burned away.

By placing curtain damper B between the main damper or sealing valve A and the checker chamber C, the main valve A, which is more expensive, is protected from the effect of heat radiated along the passage 39 between the valve and the checker chamber and is also protected from direct impingement of the highly heated waste gases.

In Figure 3, I have shown an arrangement of valves 15 and 18 of Figure 1 and valves 25 and 28 of Figure 2, which exists when the furnace illustrated in Figure 1 or Figure 2 is operating so that the gases are passing therethrough in the direction indicated by the arrows. In this case, the air valve 40 is opened the proper distance to admit the desired quantity of air and both dampers A and B are in the down position thus closing off the flue connecting the checker chamber and the discharge stack.

In Figure 4, I have shown an arrangement of the valve structure when the waste gases are passing through the checker chamber and past the valve structure on their way to the discharge stack. This illustrates the position of the various parts of the valve structure in the arrangement of valves 15' and 18' of Figure 1 and valves 25' and 28' of Figure 2.

In Figure 4, the air valve 40 is closed and the discharging highly heated waste gases are flowing in the direction indicated by the arrow. It will be observed that damper A has been raised so that it is entirely clear of the flue and the regulation of the gas flow is controlled by the position of plate 35 of damper B. It will be apparent that the more expensive valve A is not subjected to the intense heat of the discharging gases and consequently the life of such a valve will be greatly prolonged. The plate 35 being of a very inexpensive construction is the only part affected by the heat, and, since this is of low first cost and can be readily replaced, the expense of operating such a valve structure is at a minimum. No harm will result if the valve 35 warps to a very considerable degree, since, even if it does warp, it will still protect the main damper or sealing valve A.

The plate 35 is readily heated by the gases passing thereby, so that there is no tendency for the deposition of soot thereon nor the deposition of tarry or gummy products as is the case where a water-cooled valve of comparatively large mass is used. By my invention, the first cost of providing suitable valves for regulating the operation of a regenerative furnace is considerably reduced over the initial cost of the water-cooled valves now employed and the upkeep is very greatly lessened. No water is used in cooling my damper, although a small amount may be employed to cool the valve seat; but even this is not necessary where the valve seat itself is made of heat resistant alloy.

For convenience, I have described and illustrated in Figures 3 and 4, the arrangement of my valve structure and the air valve as applied to valves 18 and 18', 15 and 15' of Figure 1, and valves 28 and 28', 25 and 25' of Figure 2, and it will be understood that the valve structure illustrated in Figures 3 and 4, without of course the air valve 40, will be used as valve structure 9, 9', 12 and 12' of Figure 1. If desired, my valve structure can be incorporated in flue 13 of Figure 1 and flue 29 of Figure 2, although such arrangement has not been shown.

The particular arrangement and location of the valves in the system as shown herein is not essential to carrying out my invention. Any suitable arrangement of the valves may be employed, the principal feature of my invention being to provide a valve structure in which the main valve is protected from the radiant heat of the checker chambers and the heat from the directly impinging hot waste gases by means of a curtain damper associated with the main damper, the curtain damper serving to regulate the flow of gases. It is apparent that my valve structure may be used in types of furnaces other than open-hearth furnaces.

It is also within the contemplation of my invention to reverse the relative positions of the main damper or the main valve A and the curtain damper or curtain valve B from that shown in the drawings. The chief function of curtain valve B is to protect the main valve A from the effects of heat and as heretofore stated, the curtain valve A is placed between the source of heat and the main valve A. Thus, if the stack 14 of Figure 1 or the stack 30 of Figure 2 is located close to the respective checker chambers, it may be advisable to place the curtain valve B between the main valve A and the stack, as the heat from the gases entering the stack may be much greater than the heat from the checker chamber.

While I have illustrated and described a preferred embodiment of my invention, it will be understood that the same is not limited thereto, but may be otherwise embodied and practiced within the scope of the following claims:

I claim:

1. In a regenerative furnace system, a passageway for conducting gases to and from the heating means of the furnace, a sealing valve operable across said passageway for opening and completely closing the same, a curtain valve operable across the passageway and interposed between the sealing valve and the heating means and effective for regulating the flow of gases through the passageway, and means between said curtain valve and the heating means for connecting said passageway to the atmosphere.

2. A valve system for the passages of a furnace system, comprising a sealing valve and cooperating water-cooled seat therefore, the sealing valve and seat being arranged to effectively close the passageway when the sealing valve is closed, a curtain valve adjacent the sealing valve and interposed between the sealing valve and the heating means for regulating the flow of gases through the passageway, and means between said curtain valve and the heating means for connecting said passageway to the atmosphere.

3. In a regenerative furnace system, a passageway for conducting gases to and from the furnace, a sealing valve in said passageway for opening and closing the same, a curtain valve in said passageway adjacent the sealing valve, a source of heat connected to the passageway and at a position beyond the valves and away from the furnace, said curtain valve being interposed between the sealing valve and the heat source, and means between the valve and the furnace for connecting the passageway to the atmosphere.

4. A regenerative furnace system having ducts for the circulation of gases through the system, main valves operable for closing the ducts or opening them for the controlled circulation of gases through the furnace, curtain valves adjacent the said main valves and disposed between said valves and a highly heated section of the ducts to protect the main valves when closed from direct exposure to high temperatures existing in the duct system, and means between the valves and the furnace for connecting the ducts to the atmosphere.

5. A valve system for the passages of a furnace system, comprising a sliding sealing valve and cooperating seat therefor, the sealing valve and the seat being arranged to effectively close the passageway when the sealing valve is closed, means outside the passageway into which the sealing valve is received when the valve is opened so that the valve is completely cleared of the passageway, said means being also clear of the passageway, and a curtain valve adjacent the sealing valve to protect the sealing valve when closed from the heat of the furnace system, said curtain valve being of an inexpensive character and so mounted as to be quickly and readily replaced without shut-down of the furnace.

6. A regenerative heating system having ducts for the circulation of gases therethrough first in one direction and then in the other, sealing valves operable for closing the ducts or opening them for the controlled circulation of gases therethrough, means outside the ducts into which the sealing valves are received when the valves are opened so that the valves are entirely cleared of the ducts, and a curtain valve associated with and located adjacent each of said sealing valves and disposed between the sealing valve and highly heated section of the ducts to protect the sealing valve when closed from direct exposure to the high temperature existing in the duct system.

7. In a regenerative heating system a duct for the circulation of gases first in one direction and then in the other, a furnace, a sealing valve operable for closing the duct or opening it for the controlled circulation of gases therethrough, means outside the duct into which the sealing valve is received when the valve is opened so that the valve is entirely cleared of the duct, a curtain valve adjacent said sealing valve and disposed between the sealing valve and a highly heated section of the duct to protect the sealing valve when closed from direct exposure to the heat from the highly heated section of the duct, and means located between the sealing valve and the furnace for connecting the duct to the atmosphere.

LAWRENCE R. McAFOOS.